US012596877B2

(12) United States Patent
Han et al.

(10) Patent No.: US 12,596,877 B2
(45) Date of Patent: Apr. 7, 2026

(54) COMPUTER-IMPLEMENTED CONTRACT RISK ASSESSMENT PLATFORM LEVERAGING TRANSFORMERS

(71) Applicant: SAP SE, Walldorf (DE)

(72) Inventors: Jianglei Han, Singapore (SG); Qisheng Hu, Singapore (SG); My Hoa Ha, Singapore (SG); Yue Yang, Singapore (SG)

(73) Assignee: SAP SE, Walldorf (DE)

( * ) Notice: Subject to any disclaimer, the term of this patent is extended or adjusted under 35 U.S.C. 154(b) by 311 days.

(21) Appl. No.: 18/463,509

(22) Filed: Sep. 8, 2023

(65) Prior Publication Data

US 2025/0086392 A1     Mar. 13, 2025

(51) Int. Cl.
*G06F 40/284* (2020.01)
*G06F 16/34* (2025.01)
*G06F 40/169* (2020.01)
*G06F 40/40* (2020.01)
*G06N 3/0455* (2023.01)
*G06N 3/048* (2023.01)
*G06N 3/08* (2023.01)

(52) U.S. Cl.
CPC ............ *G06F 40/284* (2020.01); *G06F 16/34* (2019.01); *G06F 40/169* (2020.01); *G06F 40/40* (2020.01); *G06N 3/0455* (2023.01); *G06N 3/048* (2023.01); *G06N 3/08* (2013.01)

(58) Field of Classification Search
CPC ...... G06F 40/284; G06F 16/34; G06F 40/169; G06F 40/40; G06F 40/30; G06N 3/0455; G06N 3/048; G06N 3/08
See application file for complete search history.

(56) References Cited

U.S. PATENT DOCUMENTS

| | | | | |
|---|---|---|---|---|
| 11,461,552 | B2 | 10/2022 | Han et al. | |
| 2007/0010992 | A1* | 1/2007 | Hon ..................... | G06F 40/253 |
| | | | | 704/9 |
| 2022/0405336 | A1* | 12/2022 | Lippe .................. | G06F 16/9535 |
| 2023/0061647 | A1* | 3/2023 | Arbelle ................. | G06F 16/538 |

FOREIGN PATENT DOCUMENTS

| | | | | | |
|---|---|---|---|---|---|
| CN | 115952803 | A | * | 4/2023 | |
| CN | 116340467 | A | * | 6/2023 | ......... G06F 16/3344 |

* cited by examiner

*Primary Examiner* — Linda Wong
(74) *Attorney, Agent, or Firm* — Fish & Richardson P.C.

(57) ABSTRACT

Methods, systems, and computer-readable storage media for receiving a document provided as a computer-readable file, receiving a set of questions, for each question in the set of questions, generating an inference input including a question, at least a portion of text of the document, and multiple tokens, processing, by a PLM, the inference input to generate a set of text embeddings, processing, by a neural network, the set of text embeddings to provide sets of tokens, each set of tokens being specific to a segment of the document and including a start token and an end token respectively identifying a start position and an end position of the segment, determining, from the sets of tokens, a segment for display, and displaying at least a portion of the document in a UI and an annotation indicating the segment within the at least a portion of the document.

17 Claims, 6 Drawing Sheets

502
Receive document and set of questions

504
Provide inference input

506
Process inference input using PLM to provide text embeddings

508
Generate token sets using neural network

510
Select segment for question

512
Display annotated segment based on tokens

COMPUTER-IMPLEMENTED CONTRACT RISK ASSESSMENT PLATFORM LEVERAGING TRANSFORMERS

BACKGROUND

Enterprises utilize a wide range and different types of software to support operations. The acquisition of software from vendors involves the initiation of a new contract or the renewal of an existing contract, which outlines the commercial clauses that both parties are required to adhere to. Due to the complexity of disciplines and the potential for conflicting interests or obligations outlined in contracts, legal disputes often arise. Such disputes can result in significant losses in terms of time, money, and reputation for the enterprises. Linguistic issues present in legal documents, including ambiguity and vagueness in the drafting of terms, are among the leading causes of legal disputes. As risk is an inherent part of a contract, it is essential for enterprises to review the applicable legal documents and analyze risk-prone clauses in terms of liability, warranty, personal data processing, and other relevant commercial risks. Computer-implemented contract risk assessment systems have adopted more advanced technology involving natural language processing to mitigate potential risks and prevent adverse impacts.

SUMMARY

Implementations of the present disclosure are directed to a computer-implemented contract risk assessment system. More particularly, implementations of the present disclosure are directed to a computer-implemented contract risk assessment system that provides improvements over traditional contract risk assessment systems by leveraging transformer-based pre-trained large models (PLMs).

In some implementations, actions include receiving a document provided as a computer-readable file, receiving a set of questions, for each question in the set of questions, generating an inference input including a question, at least a portion of text of the document, and multiple tokens, processing, by a PLM, the inference input to generate a set of text embeddings, processing, by a neural network, the set of text embeddings to provide sets of tokens, each set of tokens being specific to a segment of the document and including a start token and an end token respectively identifying a start position and an end position of the segment, determining, from the sets of tokens, a segment for display, and displaying at least a portion of the document in a user interface (UI) and an annotation indicating the segment within the at least a portion of the document. Other implementations of this aspect include corresponding systems, apparatus, and computer programs, configured to perform the actions of the methods, encoded on computer storage devices.

These and other implementations can each optionally include one or more of the following features: tokens in each set of tokens is associated with a logit including a non-normalized value that is normalized by a softmax function; determining, from the sets of tokens, a segment for display includes determining a score difference based on a null score and a non-null score and selecting the segment; the segment is selected based on a null prediction represented by the null score in response to the score difference exceeding a threshold; the document includes a contract and the segment includes a portion of a clause of the contract; the annotation includes highlighting of the segment in the UI, the highlighting extending from the start token and the end token determined for the segment; and the PLM includes a Bidirectional Encoder Representations from Transformers (BERT) model.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 4 depicts an example user interface in accordance with implementations of the present disclosure.

Like reference symbols in the various drawings indicate like elements.

DETAILED DESCRIPTION

Figure 1:
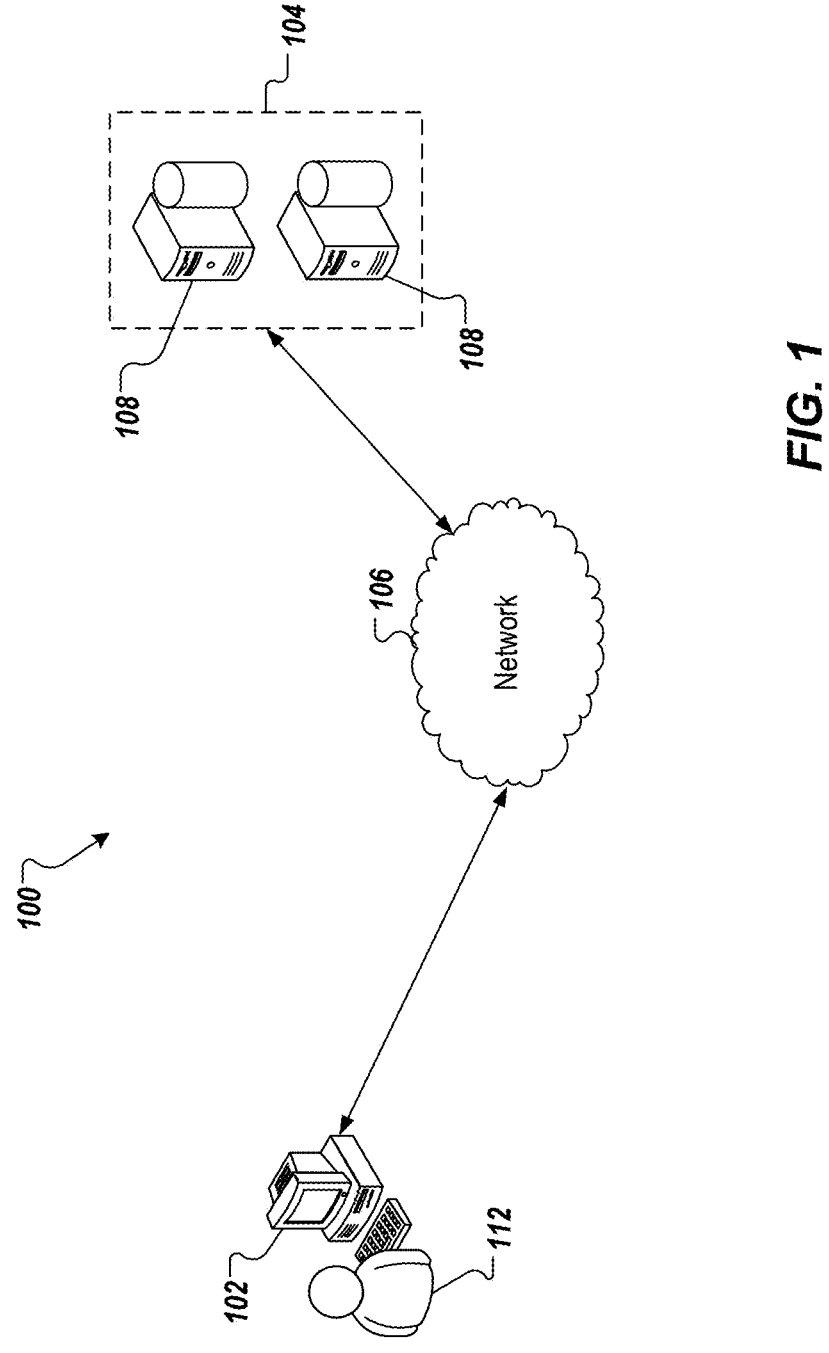
FIG. 1 depicts an example architecture that can be used to execute implementations of the present disclosure.

Implementations of the present disclosure are directed to a computer-implemented contract risk assessment system. More particularly, implementations of the present disclosure are directed to a computer-implemented contract risk assessment system that provides improvements over traditional contract risk assessment systems by leveraging transformer-based pre-trained large models (PLMs).

Implementations can include actions of receiving a document provided as a computer-readable file, receiving a set of questions, for each question in the set of questions, generating an inference input including a question, at least a portion of text of the document, and multiple tokens, processing, by a PLM, the inference input to generate a set of text embeddings, processing, by a neural network, the set of text embeddings to provide sets of tokens, each set of tokens being specific to a segment of the document and including a start token and an end token respectively identifying a start position and an end position of the segment, determining, from the sets of tokens, a segment for display, and displaying at least a portion of the document in a user interface (UI) and an annotation indicating the segment within the at least a portion of the document.

To provide further context for implementations of the present disclosure, and as introduced above, enterprises utilize a wide range of software to support operations and different types of software are commonly employed across organizations. The acquisition of software from vendors involves the initiation of a new contract or the renewal of an existing contract, which outlines the commercial clauses that both parties are required to adhere to. Due to the complexity of disciplines and the potential for conflicting interests or obligations outlined in contracts, legal disputes often arise. Such disputes can result in significant losses in terms of time, money, and reputation for the enterprises. Linguistic issues present in legal documents, including ambiguity and vagueness in the drafting of terms, are among the leading causes of legal disputes. As risk is an inherent part of a contract, it is essential for enterprises to review the applicable legal documents and analyze risk-prone clauses in terms of liability, warranty, personal data processing, and other relevant commercial risks.

Enterprises continuously seek to improve and gain efficiencies and reduce risk in their operations. Recently, enterprises have embarked on the journey of so-called intelligent enterprise, which includes automating tasks executed in support of enterprise operations using machine learning (ML) systems. With regard to assessing contract risk, advanced technology in the form of computer-implemented contract risk assessment systems that are leveraged to mitigate potential risks and prevent adverse impacts. However, contract risk assessment demands specialized knowledge and resources to process voluminous legal documents.

In recent years, researchers have sought to accelerate and automate the contract review process through the utilization of techniques related to NLP. The advancement of NLP has demonstrated strong potential for applications such as text classification, entity recognition, and information retrieval. The incorporation of NLP and other innovative techniques, such as ML and ontology, has significantly advanced the field of computer-based contract risk assessment. Rule-based and semantic modeling approaches have been proposed for automation of contract risk assessment. For example, conflict resolution rules have been implemented to automate regulatory compliance checking. As another example, a rule-based system has been developed to automate extraction of poisonous clauses.

Although the design of pattern rules using syntactic and semantic text features has improved the efficiency of contract review automation, these traditional approaches lack scalability for practical adoption in the contract review process. More particularly, these traditional approaches depend on human-designed and coded rules. Such rules might be invalid if applied to different standard contracts and require re-coding/re-development in response to changes, which is both time- and resource-consuming. For example, it is not feasible to design rules that can be used for all types of contracts, and, as new types of contracts arise and/or changes are made, coded rules become obsolete.

In view of this, supervised ML models and text embedding techniques have emerged to address the scalability issue of rule-based methods. For example, clause classification models leveraging text embedding, Naive Bayes, and support vector machine have been developed. As another example, a ML-based hierarchical classification model has been introduced to achieve a more granular level of clause classification under different domains. ML-based approaches have shown improvement in efficiency and scalability compared to rule-based approaches. Moreover, the successful application of text embedding and supervised ML models shed light on the feasibility of self-learning complex relations among contract text. However, traditional contract risk assessment systems that leverage ML have disadvantages. For example, one drawback of ML-based solutions in contract processing is that comprehensive semantic analysis is needed for feature engineering, which is a time- and resource expensive process.

In view of the above context, implementations of the present disclosure provide an improved computer-implemented contract risk assessment system that leverages PLMs. More particularly, and as described in further detail herein, implementations of the present disclosure treat the contract review process as an information retrieval problem. As such, implementations of the present disclosure utilize PLMs in a question-answer paradigm that assists contract risk identification by efficiently locating risk-prone clauses leveraging pre-trained transformer-based models. Given a predefined list of questions related to aspects of risk evaluation, the contract risk assessment system of the present disclosure can efficiently identify and highlight risk-prone clauses, thereby saving time and technical resources. That is, and as an advantage over traditional rule-based and ML-based techniques, implementations of the present disclosure enables the retrieval of specific text segments as answers rather than entire documents. In this manner, smaller sizes (e.g., bytes) of data are returned and further querying and/or processing of entire documents is avoided, which conserve technical resources (e.g., processing, memory).

Implementations of the present disclosure also address training of such PLMs. Ideally, training of such PLMs requires a large amount of labeled data, which can be scarce. In view of the scarcity of training data, implementations of the present disclosure leverage transfer learning by fine-tuning the PLMs to enhance performance thereof.

Implementations of the present disclosure are described in further detail with non-limiting reference to an example PLM. The example PLM includes Bidirectional Encoder Representations from Transformers (BERT) model, also referred to as BERT herein. BERT can be described as a deep bidirectional transformer language model that has demonstrated strong performance in many NLP inference tasks, including text classification and information retrieval. While BERT is reference herein for purposes of non-limiting illustration, it is contemplated that implementations of the present disclosure can be realized using any appropriate PLM.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host a computer-implemented contract risk assessment system for evaluating contracts provided as computer-readable documents. More particularly, and as described in further detail herein, the user 112 can query the contract risk assessment system based on a contract and, in response, the contract risk assessment system returns specific text segments of the contract, which are responsive to the query. In some examples, the server system 104 also hosts a training system to train a LLM used by the specific text segments in accordance with implementations of the present disclosure.

Figure 2:
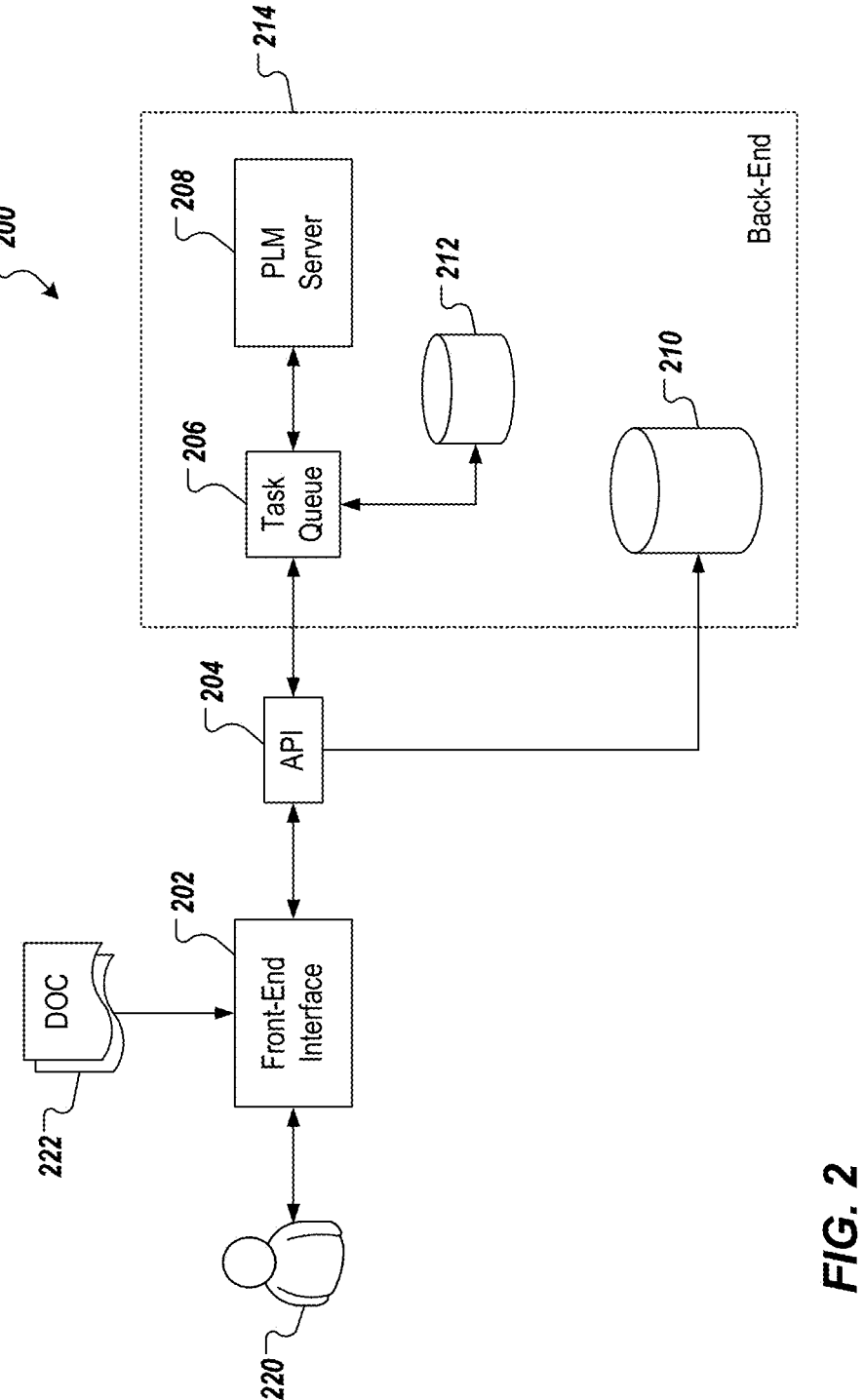
FIG. 2 depicts an example conceptual architecture in accordance with implementations of the present disclosure.

FIG. 2 depicts an example conceptual architecture 200 in accordance with implementations of the present disclosure. In the depicted example, conceptual architecture 200 includes a front-end interface (UI) 202, an application programming interface (API) 204, a task queue 206, a PLM server 208, a database 210, and a data store 212. In some examples, the task queue 206, the PLM server 208, the database 210, and the data store 212 can be collectively provided in a back-end system 214. In some examples, the API 204 can be provided using the FastAPI framework. However, the API 204 can be provided as any appropriate API. In some examples, the task queue 206 is provided as a Celery task queue. However, the task queue 206 can be provided as any appropriate task queue. In some examples, the PLM server 208 is provided using TorchServe to serve a PLM model, which can be provided as a PyTorch model. It is contemplated, however, that the PLM server 208 can be provided using any appropriate serving tool and that the PLM model can be provided as any appropriate model. The database 210 can be provided with any appropriate database system (e.g., SAP Hana). In some examples, the data store 212 can be provided as Redis in-memory data store. It is contemplated, however, that the data store 212 can be provided as any appropriate data store.

As described in further detail herein, a user 220 can upload one or more computer-readable files 222 (e.g., PDF files) that record one or more contracts (contract files) using the front-end interface 202. The PLM executed by the PLM server 208 processes the one or more computer-readable files 222 to identify risk-prone clauses. For example, segments of clauses can be identified by the PLM model and highlighted to the user 220.

In further detail, the one or more computer-readable files 222 and a set of questions are transmitted as part of an inference request to the task queue 206 through the API 204 (e.g., the front-end interface 202 makes an API call to the API 204 including the one or more computer-readable files 222 and the set of questions). In some examples, the task queue 206 queues the inference request for processing by the PLM server 208. In some examples, the inference request is transmitted from the task queue 206 to the PLM server 208 (e.g., as a hypertext transfer protocol (HTTP) request). The PLM executed by the PLM server 208 processes the one or more computer-readable files 222 in view of the set of questions to generate an inference result that is returned to the task queue 206 (e.g., as a HTTP response).

In some implementations, the inference result includes a set of segments and, for each segment a confidence score. In some examples, each segment is defined by a start token and an end token. In some examples, each confidence score represents a likelihood that a respective text segment is relevant to a question in the set of questions (e.g., the text segment is an answer to the question).

In some implementations, the task queue 206 provides task metadata and inference results to the data store 212. Example task metadata can include, without limitation, a unique identifier for each task (e.g., each contract file), file name, name of uploader, date last modified by, task status, and the like. In some examples, the inference result is provided to the front-end interface 202 for display to the user 220. For example, and as described in further detail herein, segments and respective confidence scores can be displayed with respective questions for review by the user 220. In some examples, the user 220 can indicate whether at least a portion of an inference result is correct. For example, the user 220 can provide input to the front-end interface 202 to indicate that a segment was correctly identified by the PLM as an answer to a respective question. In some examples, the user 220 can indicate whether at least a portion of an inference result is incorrect. For example, the user 220 can provide input to the front-end interface 202 to indicate that a segment was incorrectly identified by the PLM as an answer to a respective question. In some examples, the inference result is stored in the database 210. In some examples, storage of the inference result in the database can include indications of whether segments are correct or incorrect responsive to input of the user 220. In this manner, the inference results and indications of correctness can be used as training data for (re)training of the PLM.

As described herein, for each question, a token set that includes a start token and an end token is provided in the inference results. The token set identifies the segment (span of text) that is determined to be an answer to a respective question. In some examples, the segments can be relevant to multiple categories. Example categories can include, without limitation, warranty, liability, global use rights, commercial use, auto-renewal, publicity/marketing, personal data processing, and sensitive data processing. In some examples, the categories can be formulated into question strings representative of respective aspects of contract risk assessment. For example, a question string for 'auto renewal' can be provided as 'Highlight auto-renewal licenses.' In this example, keywords, such as auto-renewal, automatically renewed, will be terminated, can be extracted and highlighted from a contract as an inference result.

In some implementations, data cleaning and pre-processing can be performed on a contract represented in a computer-readable file. For example, the data cleaning and pre-processing is performed before concatenating questions and contract texts, described in further detail herein, to ensure that answers maintain a consistent format and are distinct without overlaps. In some examples, multiple data-cleaning approaches can be performed. Example data-cleaning approaches can include, without limitation, deleting section headers, merging neighbor answers for the same question, and simplifying samples in specific labels. With regard to deleting section headers, labeled section headers are removed because some samples could include contract section headers, while others are only labeled with the clauses. The section headers are deleted to align all samples represented in the dataset (e.g., paired questions-answers in the dataset). With regard to merging neighbor answers for the same question, for two labeled segments, when the distance between the start character position of the second segment and the end character position of the first segment is below a threshold (e.g., 30), the two segments should be merged into one labeled sample. With regard to simplifying samples in specific labels, for contract clause labeling datasets, short and scattered segment pieces belonging to certain categories could be found throughout the contract. This approach simplified the samples by removing the fragmented ones.

Figure 3:
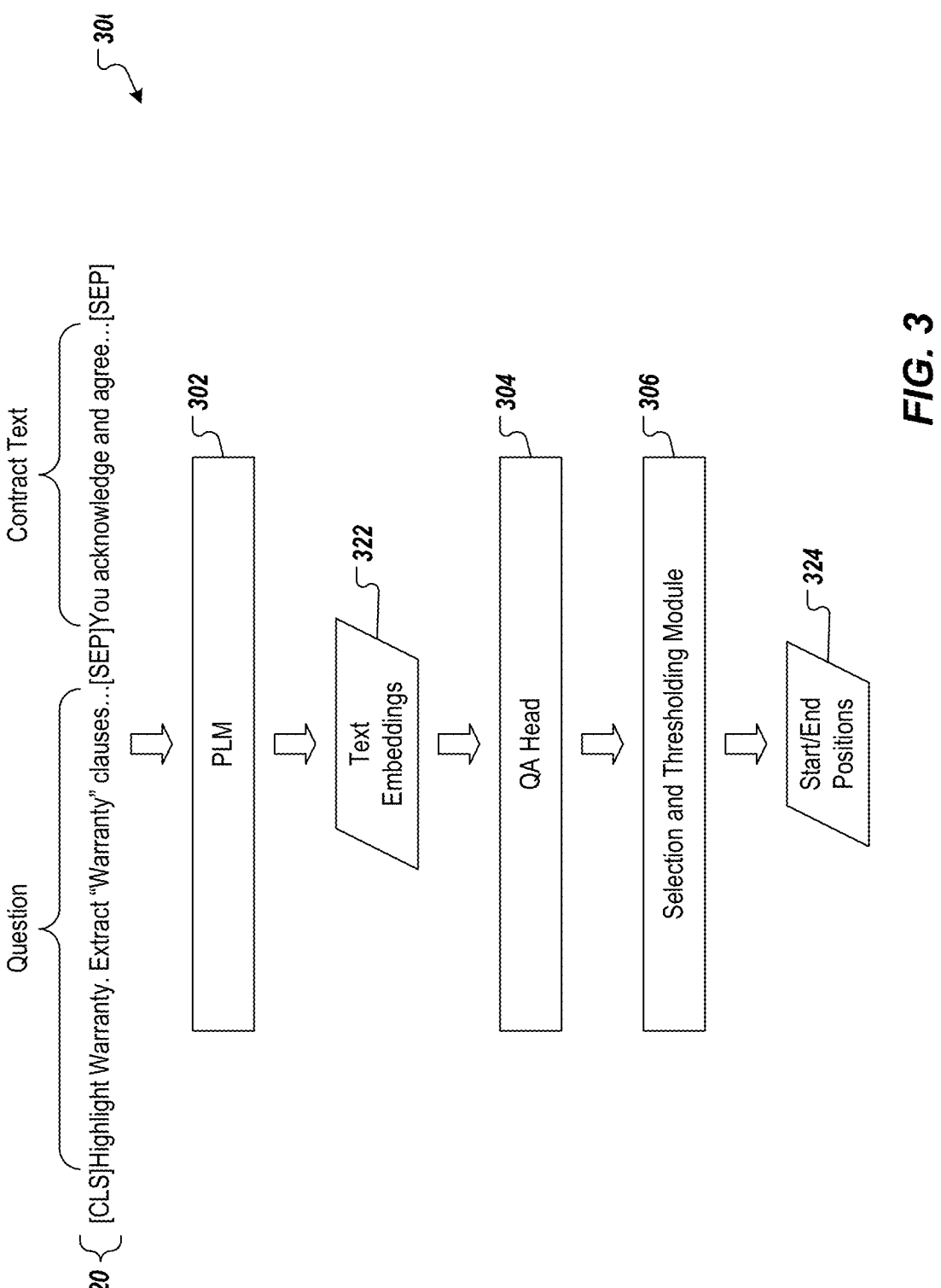
FIG. 3 depicts an example framework architecture for contract risk assessment in accordance with implementations of the present disclosure.

FIG. 3 depicts an example framework architecture 300 for contract risk assessment in accordance with implementations of the present disclosure. In the example of FIG. 3, the framework architecture 300 represents a model pipeline that includes a PLM 302, a question-answer classifier head, referred to as a QA head 304 herein, and a selection and thresholding module 306. As described in further detail herein, the PLM 302 processes an inference input 320 to provide text embeddings 322. The text embeddings 322 are processed by the QA head 304 to provide logits for each of start tokens and end tokens of an answer to the question, which are processed by the selection and thresholding module 306 to provide an inference result 324 that includes start position (a start token) and an end position (an end token) for an answer to the question.

With regard to inference, implementations of the present disclosure use extractive question answering (EQA) to efficiently locate relevant clauses (e.g., segments thereof) from a contract. EQA can be described as a QA task that extracts an answer span (segment of text) to a given question from a provided passage. In some examples, an inference input (e.g., the inference input 320) is provided by concatenating a question in the set of questions with text of the contract. In some examples, concatenation includes using [CLS] tokens and [SEP] tokens to enable the PLM to encode the concatenated question-contract text and predict (infer) the start position and end position for segment identification. Here, concatenation can be in the form of:

[CLS] question [SEP] contract text [SEP]

Here, the [CLS] token indicates that it is to be inferred (predicted) whether the contract text directly follows the question and the [SEP] token is a separator. In some examples, the contract text can include the entire text of the contract. In some examples, the contract text can include a portion of the text of the contract (e.g., the text of the contract exceeds a token limit and, in response, is divided into multiple parts that are processed individually). A set of text embeddings is provided by the PLM (e.g., the PLM 302) based on the inference input. A text embedding can be described as a multi-dimensional vector the encodes a string of text.

In some implementations, and as introduced above, the QA head processes the set of text embeddings to provide a start token and an end token for each potential answer determined from the PLM. That is, token sets are provided, each token set including a start token and an end token for a segment that is a potential answer to a question. In some examples, the QA head is provided as a fully connected neural network layer. Inside the QA head are two weights, one weight for a start token logit and another weight for an end token logit. In some examples, the weights function as a bias to guide attention towards specific tokens for the start and end positions. Here, a logit refers to the raw output of the QA head before it is transformed into probabilities. A logit can be described as an unnormalized output of the last layer of a neural network, here, the QA head. Within the QA head, the start token logits and the end token logits are separately calculated for each token set with the embeddings and the weights. A softmax activation is applied to generate a (normalized) probability distribution over all of the tokens for the token sets. In some examples, the softmax activation includes a softmax function That can be described as converting a vector k real numbers (e.g., logits) and normalizing the vector into a probability distribution that includes k probabilities. In this manner, a probability distribution is normalized, such that each probability is in a range of [0, 1] and the sum of the k probabilities is equal to 1.

Initial inference results always include non-empty results for every question. However, not every contract has all of the clauses corresponding to every question in the set of questions. In view of this, implementations of the present disclosure include selection and thresholding (e.g., executed by the selection and thresholding module 306). In EQA, an answer is the tokens between the start token and the end token determined for that answer. These correspond to the position with the maximum logits of the start and end prediction, respectively. For null-answer (negative) samples, the ideal start position and end position should be the first token of the input span (i.e., [CLS]).

A null-answer sample should have relatively large start and end logits at the first token position during inference. A score that measures how possible the prediction is null can be provided as:

$$score\_null = start\_logits[0] + end\_logits[0] \qquad (1)$$

A corresponding score for non-empty prediction can be provided as:

$$score\_non\_null = best\_start\_logit + best\_end\_logit \qquad (2)$$

where best_start_logit is a maximum of the start tokens and best_end_logit is a maximum of the end token logits.

By taking the difference between score_non_null and score_null, a difference (score_diff) is determined and represents how confident the null answer is predicted over the non-null answer. A threshold $\tau$ is adopted, and the null prediction is selected when score_diff>$\tau$. In some examples, $\tau$ is calculated by a greedy method to maximize the F1 score on a validation set used during training. The F1 score can be described as combining the precision and recall of a classifier into a single metric by taking their harmonic mean, and is used to compare the performance of classifiers. For each contract document in the dataset, the labeled clause samples belonging to specific categories in the set of questions are considered positive samples, and the rest of the categories are considered negative samples. The trained model should predict the null answer for negative samples. Finally, the tokens with maximum probability are the start and end tokens of the answer span and are output in the inference result.

Figure 4:
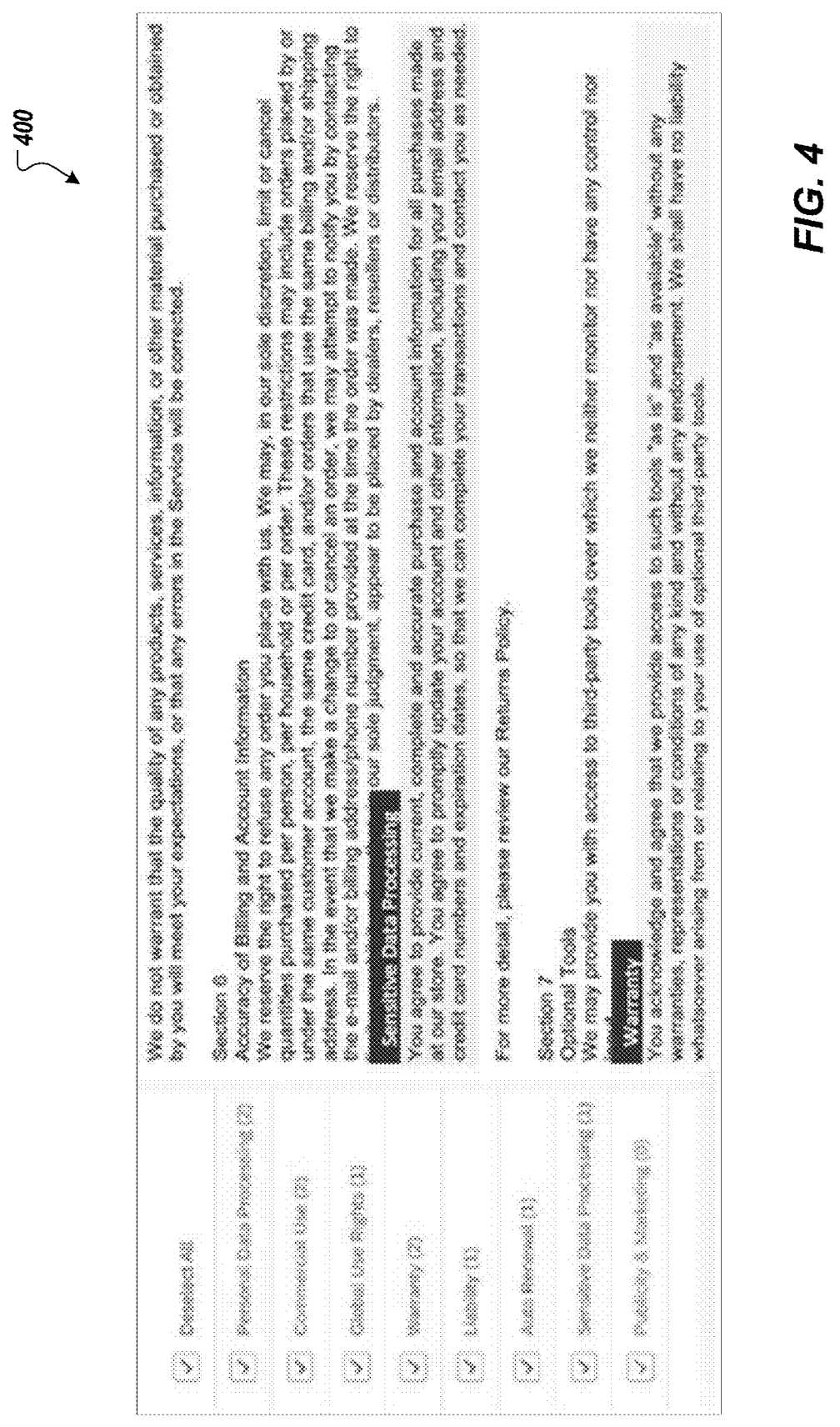

FIG. 4 depicts an example UI 400 in accordance with implementations of the present disclosure. In the example of FIG. 4, a 'Sensitive Data Processing' clause and a 'Warranty' clause of an example contract are identified and highlighted in respective shades (e.g., purple, green).

As introduced above, implementations of the present disclosure address training of PLMs. Ideally, training of PLMs requires a large amount of labeled data. However, obtaining labeled training data samples can be challenging or costly in many real-world ML scenarios. Transfer learning, which involves leveraging pre-trained models on related tasks, can be utilized to enhance the performance of models that have been trained on limited size datasets. In the instant case, training can be executed using a dataset that includes 2100 annotations from 228 contract documents labeled by various stakeholders. As such, this dataset is relatively limited in size.

In view of this, implementations of the present disclosure leverage transfer learning to boost the PLM and to achieve good performance in terms of robustness and accuracy. Although using the PLM can be in and of itself transfer learning (e.g., the PLM has already acquired language modeling knowledge from the pre-training stage), here, transfer learning is used in fine-tuning with a secondary dataset. In the context of the present disclosure, an example secondary dataset can include the Contract Understanding Atticus Dataset (CUAD), which can be described as a corpus of more than 13,000 expert annotations in 510 legal contracts, the annotations spanning over 40 categories.

In some examples, transfer learning can include using the CUAD to pre-train and fine-tune a transformer-based language model on the CUAD diverse text corpus. The output is a set of model weights that have learned to understand legal clauses and their contexts. Subsequentially, the training can be adapted by additional training and fine-tuning on a dataset to generate a production-ready model. This additional training process helps the model specialize in identifying the specific clauses present in the documents.

In some examples, during training, both parameters of the PLM and the QA head are adjusted. That is, for example, the PLM and QA head are concurrently trained.

Figure 5:
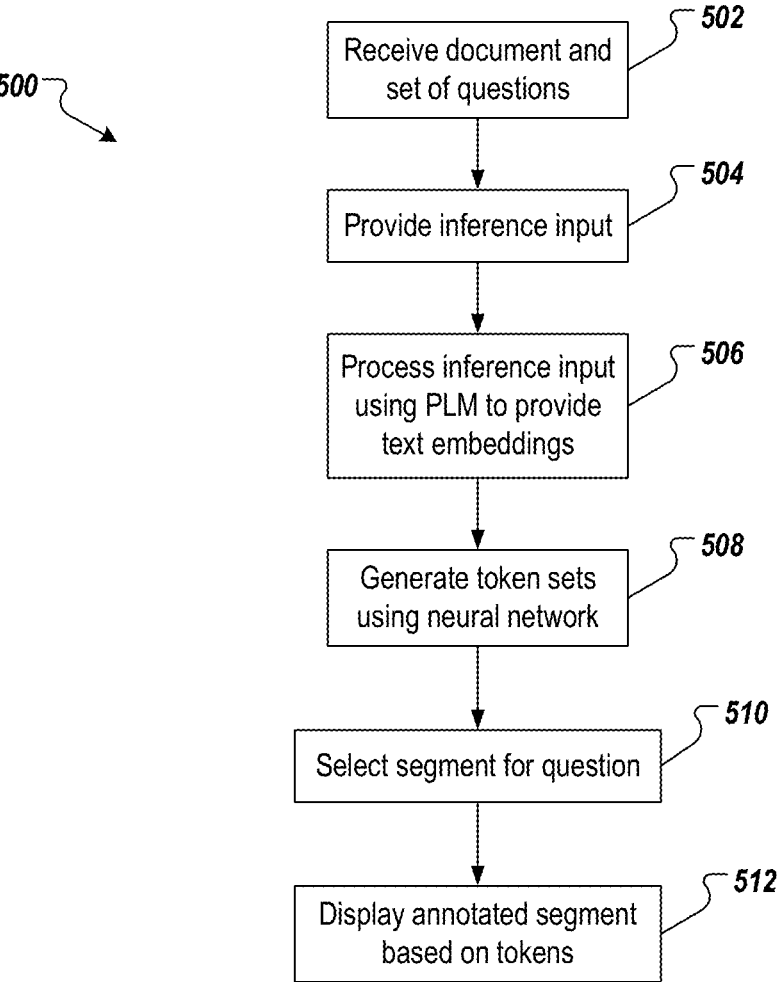
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices.

A document and a set of questions are received (502). For example, and as described in detail herein, the PLM server 208 of FIG. 2 receives the document and the set of questions in a HTTP request from the task queue 206. An inference input is provided (504). For example, and as described in detail herein, the inference input (e.g., the inference input 320) is provided by concatenating a question in the set of questions with text of the document. In some examples, concatenation includes using [CLS] tokens and [SEP] tokens to enable the PLM to encode the concatenated question-document text and predict (infer) start positions and end positions of respective segments.

The inference input is processed using a PLM to provide text embeddings (506). For example, and as described in detail herein, the PLM 302 of FIG. 3 processes the inference input to generate the text embeddings. Sets of tokens are generated by a neural network (508). For example, and as described in detail herein, the QA head 304 processes the text embeddings to determine, for each segment that might be a match for the question, a set of tokens and respective token logits, the set of tokens including a start token and an end token of a respective segment.

A segment is selected (510) and is annotated in a display (512). For example, and as described in detail herein, a score difference is determined based on a null score and a non-null score and selecting the segment, and a segment is selected based on a null prediction represented by the null score in response to the score difference exceeding a threshold. Further, at least a portion of the document is displayed in a UI (e.g., the UI 400 of FIG. 4) and an annotation indicating the segment within the at least a portion of the document. In some examples, the annotation includes highlighting of the segment in the UI, the highlighting extending from the start token and the end token determined for the segment.

Implementations of the present disclosure achieve multiple improvements over traditional computer-implemented contract risk assessment systems. Experiments conducted over implementations of the present disclosure highlight improvements achieved by implementations of the present disclosure.

In further detail, a contract dataset 228 software contracts and 1618 labeled samples after data cleaning was used. The dataset was divided by document level for training and testing purposes, and the contract samples were randomly allocated into train, validation, and test sets. In the experiments, samples from 159 contracts (70%) were used for training, 34 contracts (15%) were used for validation, and 35 contracts (15%) were used for the test set. Table 1 presents the distribution of each category in the dataset.

TABLE 1

| Label Category Distribution | | | |
| --- | --- | --- | --- |
| Category | Document Count | Sample Count | Average Document |
| Commercial Use | 183 | 288 | 1.57 |
| Warranty | 215 | 235 | 1.09 |
| Liability | 215 | 230 | 1.07 |
| Personal Data Processing | 165 | 333 | 2.02 |
| Sensitive Data Processing | 44 | 51 | 1.16 |
| Publicity/Marketing | 59 | 62 | 1.05 |
| Global Use Rights | 191 | 292 | 1.53 |
| Auto-Renewal | 98 | 127 | 1.30 |

In these experiments, Robustly optimized BERT (RoBERTa) was selected as a backbone model architecture for training, and can be described as building on BERT and modifying key hyperparameters, removing the next-sentence pretraining objective and training with larger mini-batches and learning rates. Both a RoBERTa-Base and a RoBERTa-Large were trained on the training set, each for a total of 10 epochs. The checkpoint with the highest F1 score on the validation set was saved for each. To exploit transfer learning, fine-tuning was performed using the CUAD dataset. To accommodate the possibility of a null answer, a null answer prediction was enabled for all experiments, which adaptively determines the threshold for selecting null answers. The maximum sequence length was set to 512 and a stride of 64 was used to process samples that exceed the maximum input length of the models.

In these experiments, the RoBERTa-base model was used as a baseline for comparison. Table 2 shows the F1 scores of the above models on positive, negative, and overall samples in the test set.

TABLE 2

| | F1 Scores | | |
|---|---|---|---|
| Model | Positive | Negative | Overall |
| RoBERTa-base | 0.606 | 0.679 | 0.633 |
| RoBERTa-large | 0.644 | 0.901 | 0.738 |
| RoBERTa-base CUAD | 0.649 | 0.753 | 0.659 |
| RoBERTa-large CUAD | 0.664 | 0.901 | 0.751 |

The results indicate that the RoBERTa-large model, which has a deeper layer structure and therefore greater capacity for learning, demonstrated a significant improvement in the F1 score for negative samples (32.7%) and positive samples (6.3%) compared to the baseline. The application of transfer learning techniques also yielded promising results. After being fine-tuned with the CUAD dataset, the RoBERTa-base model exhibited an increase of 7% and 10.8% in the F1 score for positive and negative samples, respectively. When the RoBERTa-large model is employed in conjunction with transfer learning, the overall F1 score was enhanced to 0.751, representing a 2% increase over the original performance of the RoBERTa-large model and a significant improvement of 18.6% compared to the baseline. In the experiments, the large models demonstrated improvements in all categories and significantly enhanced performance for negative samples compared to the base models.

Table 3 shows more detailed performance with respect to each predefined category.

TABLE 3

| | F1 Score per Category | | | |
|---|---|---|---|---|
| Category | RoBERTa-base | RoBERTa-large | RoBERTa-base CUAD | RoBERTa-large CUAD |
| Commercial Use | 0.386 | 0.531 | 0.397 | 0.518 |
| Warranty | 0.592 | 0.664 | 0.397 | 0.518 |
| Liability | 0.694 | 0.726 | 0.618 | 0.697 |
| Personal Data Processing | 0.756 | 0.658 | 0.759 | 0.734 |
| Sensitive Data Processing | 0.724 | 0.931 | 0.635 | 0.687 |
| Publicity/ Marketing | 0.939 | 0.948 | 0.862 | 0.931 |
| Global Use Rights | 0.625 | 0.659 | 0.834 | 0.910 |
| Auto-Renewal | 0.478 | 0.768 | 0.689 | 0.821 |

As shown in Table 3, fine-tuning with the CUAD resulted in noticeable improvements in the F1 score for most categories, with the exception of 'Personal Data Processing' and 'Publicity/Marketing.' The RoBERTa-large model finetuned with the CUAD even achieved an F1 score of 0.821 for the 'Autorenewal' category, which is significantly higher (71.7%) than the baseline.

The improvement seen from transfer learning is understood to be due to the CUAD being a commercial contract dataset, which intuitively contains more legal terms and domain knowledge of the contract processing field. More particularly, the clause samples in the CUAD are annotated by experienced lawyers, which may have contributed to the models' acquisition of hidden domain knowledge upon fine-tuning with CUAD. It is believed that this hidden domain knowledge facilitated improved performance when the models were further fine-tuned with the dataset presented herein.

Figure 6:
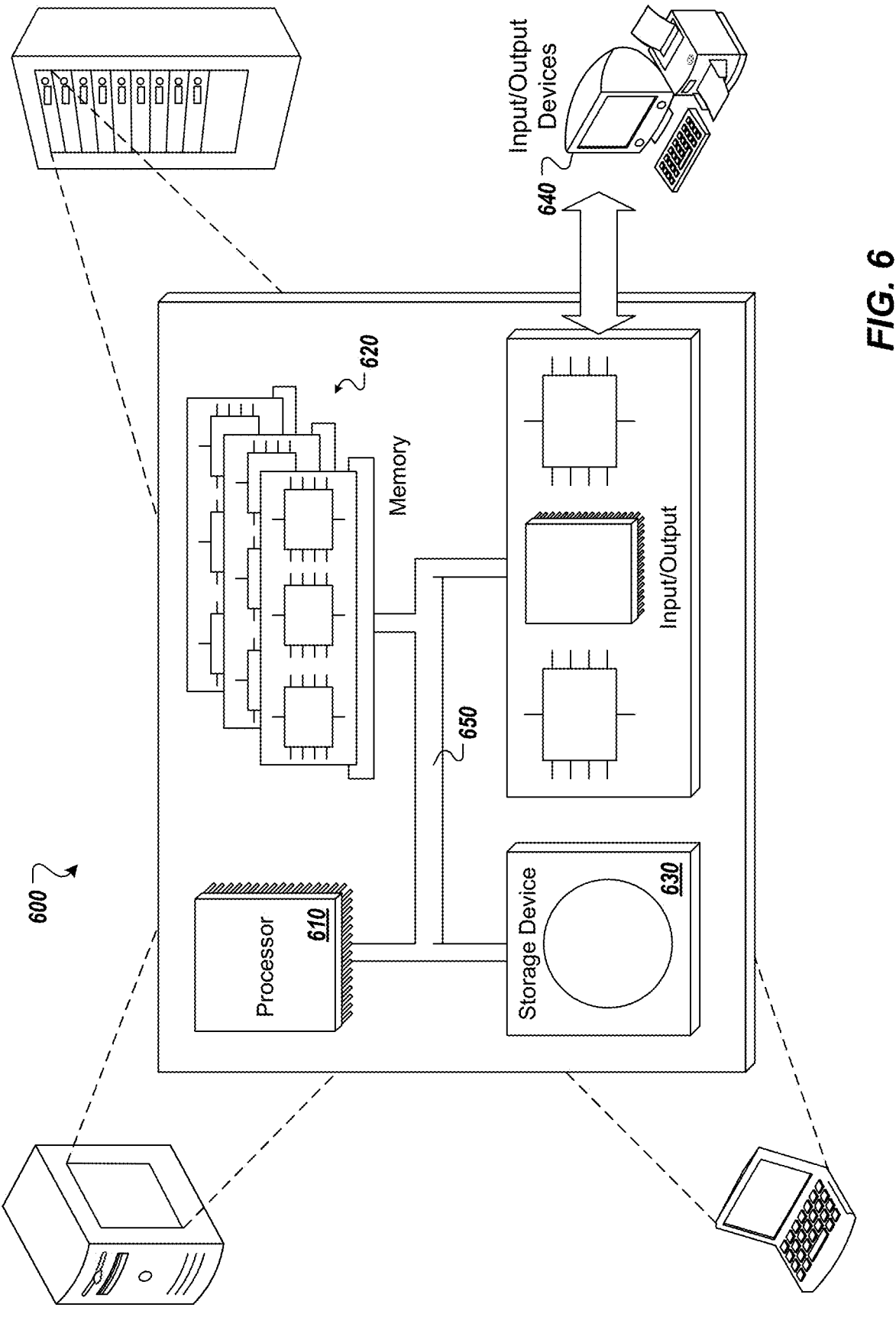
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for automatic identification and display of segments of text in computer-readable documents, the method being executed by one or more processors and comprising:

receiving a document provided as a computer-readable file;

receiving a set of questions;

for each question in the set of questions, generating an inference input comprising a question, at least a portion of text of the document, and multiple tokens;

processing, by a pre-trained language model (PLM), the inference input to generate a set of text embeddings;

processing, by a neural network, the set of text embeddings to provide sets of tokens, each set of tokens being specific to a segment of the document and comprising a start token and an end token respectively identifying a start position and an end position of the segment;

determining, from the sets of tokens, a segment for display by determining a score difference based on a null score and a non-null score and selecting the segment; and displaying at least a portion of the document in a user interface (UI) and an annotation indicating the segment within the at least a portion of the document.

2. The method of claim 1, wherein tokens in each set of tokens is associated with a logit comprising a non-normalized value that is normalized by a softmax function.

3. The method of claim 1, wherein the segment is selected based on a null prediction represented by the null score in response to the score difference exceeding a threshold.

4. The method of claim 1, wherein the document comprises a contract and the segment comprises a portion of a clause of the contract.

5. The method of claim 1, wherein the annotation comprises highlighting of the segment in the UI, the highlighting extending from the start token and the end token determined for the segment.

6. The method of claim 1, wherein the PLM comprises a Bidirectional Encoder Representations from Transformers (BERT) model.

7. A non-transitory computer-readable storage medium coupled to one or more processors and having instructions stored thereon which, when executed by the one or more processors, cause the one or more processors to perform operations for automatic identification and display of segments of text in computer-readable documents, the operations comprising:

receiving a document provided as a computer-readable file;

receiving a set of questions;

for each question in the set of questions, generating an inference input comprising a question, at least a portion of text of the document, and multiple tokens;

processing, by a pre-trained language model (PLM), the inference input to generate a set of text embeddings;

processing, by a neural network, the set of text embeddings to provide sets of tokens, each set of tokens being specific to a segment of the document and comprising a start token and an end token respectively identifying a start position and an end position of the segment;

determining, from the sets of tokens, a segment for display by determining a score difference based on a null score and a non-null score and selecting the segment; and displaying at least a portion of the document in a user interface (UI) and an annotation indicating the segment within the at least a portion of the document.

8. The non-transitory computer-readable storage medium of claim 7, wherein tokens in each set of tokens is associated with a logit comprising a non-normalized value that is normalized by a softmax function.

9. The non-transitory computer-readable storage medium of claim 7, wherein the segment is selected based on a null prediction represented by the null score in response to the score difference exceeding a threshold.

10. The non-transitory computer-readable storage medium of claim 7, wherein the document comprises a contract and the segment comprises a portion of a clause of the contract.

11. The non-transitory computer-readable storage medium of claim 7, wherein the annotation comprises highlighting of the segment in the UI, the highlighting extending from the start token and the end token determined for the segment.

12. The non-transitory computer-readable storage medium of claim 7, wherein the PLM comprises a Bidirectional Encoder Representations from Transformers (BERT) model.

13. A system, comprising:

a computing device; and a computer-readable storage device coupled to the computing device and having instructions stored thereon which, when executed by the computing device, cause the computing device to perform operations for automatic identification and display of segments of text in computer-readable documents, the operations comprising:

receiving a document provided as a computer-readable file;

receiving a set of questions;

for each question in the set of questions, generating an inference input comprising a question, at least a portion of text of the document, and multiple tokens;

processing, by a pre-trained language model (PLM), the inference input to generate a set of text embeddings;

processing, by a neural network, the set of text embeddings to provide sets of tokens, each set of tokens being specific to a segment of the document and comprising a start token and an end token respectively identifying a start position and an end position of the segment;

determining, from the sets of tokens, a segment for display by determining a score difference based on a null score and a non-null score and selecting the segment; and displaying at least a portion of the document in a user interface (UI) and an annotation indicating the segment within the at least a portion of the document.

14. The system of claim 13, wherein tokens in each set of tokens is associated with a logit comprising a non-normalized value that is normalized by a softmax function.

15. The system of claim 13, wherein the segment is selected based on a null prediction represented by the null score in response to the score difference exceeding a threshold.

16. The system of claim 13, wherein the document comprises a contract and the segment comprises a portion of a clause of the contract.

17. The system of claim 13, wherein the annotation comprises highlighting of the segment in the UI, the highlighting extending from the start token and the end token determined for the segment.

* * * * *